United States Patent
Dhinge et al.

(10) Patent No.: US 11,781,757 B2
(45) Date of Patent: Oct. 10, 2023

(54) AUTOMATIC RACK SYSTEM FOR A COOKING APPLIANCE

(71) Applicant: WHIRLPOOL CORPORATION, Benton Harbor, MI (US)

(72) Inventors: Tushar Ravindra Dhinge, Yeola (IN); Harichandra Prabhakar Lambate, Pune (IN)

(73) Assignee: Whirlpool Corporation, Benton Harbor, MI (US)

( * ) Notice: Subject to any disclaimer, the term of this patent is extended or adjusted under 35 U.S.C. 154(b) by 170 days.

(21) Appl. No.: 17/308,227

(22) Filed: May 5, 2021

(65) Prior Publication Data
US 2022/0357049 A1 Nov. 10, 2022

(51) Int. Cl.
  *F24C 15/16* (2006.01)
  *F16H 25/18* (2006.01)

(52) U.S. Cl.
  CPC ............ *F24C 15/168* (2013.01); *F16H 25/18* (2013.01)

(58) Field of Classification Search
  CPC .............................. F24C 15/168; F16H 25/18
  USPC ................................................ 312/228.1, 410
  See application file for complete search history.

(56) References Cited

U.S. PATENT DOCUMENTS

| | | | |
|---|---|---|---|
| 2,185,763 A * | 1/1940 | De Lisle | B42F 15/06 91/444 |
| 2,879,763 A | 3/1959 | Long | |
| 3,059,634 A | 10/1962 | Brinkman et al. | |
| 5,087,107 A * | 2/1992 | Fumanelli | E05G 5/006 312/249.11 |
| 7,679,888 B2 * | 3/2010 | Kirschner | A47B 81/064 361/679.01 |
| 2007/0017387 A1 | 1/2007 | Kim et al. | |
| 2007/0131668 A1 * | 6/2007 | Kim | F24C 15/166 219/392 |
| 2014/0197720 A1 * | 7/2014 | Sorbara | A47B 51/00 312/247 |
| 2015/0323244 A1 * | 11/2015 | Marts | A47B 96/025 108/65 |
| 2018/0177380 A1 * | 6/2018 | Wilson | A47L 15/46 |

FOREIGN PATENT DOCUMENTS

| | | | | |
|---|---|---|---|---|
| CN | 101940437 A | 1/2011 | | |
| DE | 463152 C | 7/1928 | | |
| DE | 19737833 A1 | 4/1998 | | |
| DE | 102011051669 A1 | 1/2013 | | |
| EP | 0521251 | * | 9/1995 | ............. F24C 15/16 |
| EP | 521251 B1 | 9/1995 | | |
| FR | 2843793 B1 | 4/2005 | | |

* cited by examiner

*Primary Examiner* — James O Hansen
(74) *Attorney, Agent, or Firm* — Price Heneveld LLP

(57) ABSTRACT

A rack assembly for a cooking appliance includes a rack operable between a stowed position and a deployed position. At least one telescoping actuator is operable between a retracted position and an extended position. At least one connector has a first end coupled to a distal end of the telescoping actuator and a second end coupled to the rack. The rack is adjusted from the stowed position to the deployed position as the telescoping actuator adjusts from the retracted position to the extended position.

17 Claims, 14 Drawing Sheets

AUTOMATIC RACK SYSTEM FOR A COOKING APPLIANCE

BACKGROUND OF THE DISCLOSURE

The present disclosure generally relates to a rack system, and more specifically, to an automatic rack system for a cooking appliance.

SUMMARY OF THE DISCLOSURE

According to one aspect of the present disclosure, a cooking appliance includes a body that defines a cooking cavity. Guide members are coupled to a sidewall within the cooking cavity. The guide members define at least a first cooking level and a second cooking level. A rack is disposed within the cooking cavity. The rack is selectively positionable on the guide members. The rack is operable between a stowed position within the cooking cavity and a deployed position extending at least partially out of the cooking cavity. An actuator assembly is coupled to a rear wall that defines the cooking cavity. The actuator assembly includes a telescoping actuator operable between a retracted position and an extended position. At least one connector is coupled to the rack and a distal end of the telescoping actuator. The rack is adjusted from the stowed position to the deployed position as the telescoping actuator is adjusted from the retracted position to the extended position.

According to another aspect of the present disclosure, a rack system for a cooking appliance includes a rack configured to be positioned at multiple cooking levels within a cooking cavity. The rack includes an inner edge. An actuator assembly is coupled to the rack and configured to adjust the rack from a stowed position to a deployed position. The actuator assembly includes a telescoping actuator adjustable between a retracted position and an extended position. At least one connector has a first end selectively coupled to a distal end of the telescoping actuator and a second end selectively coupled to the inner edge of the rack. A motor is operably coupled to the telescoping actuator. A controller is operably coupled to the actuator assembly. The controller is configured to activate the motor.

According to yet another aspect of the present disclosure, a rack assembly for a cooking appliance includes a rack operable between a stowed position and a deployed position. At least one telescoping actuator is operable between a retracted position and an extended position. At least one connector has a first end coupled to a distal end of the telescoping actuator and a second end coupled to the rack. The rack is adjusted from the stowed position to the deployed position as the telescoping actuator adjusts from the retracted position to the extended position.

These and other features, advantages, and objects of the present disclosure will be further understood and appreciated by those skilled in the art by reference to the following specification, claims, and appended drawings.

Figure 1:
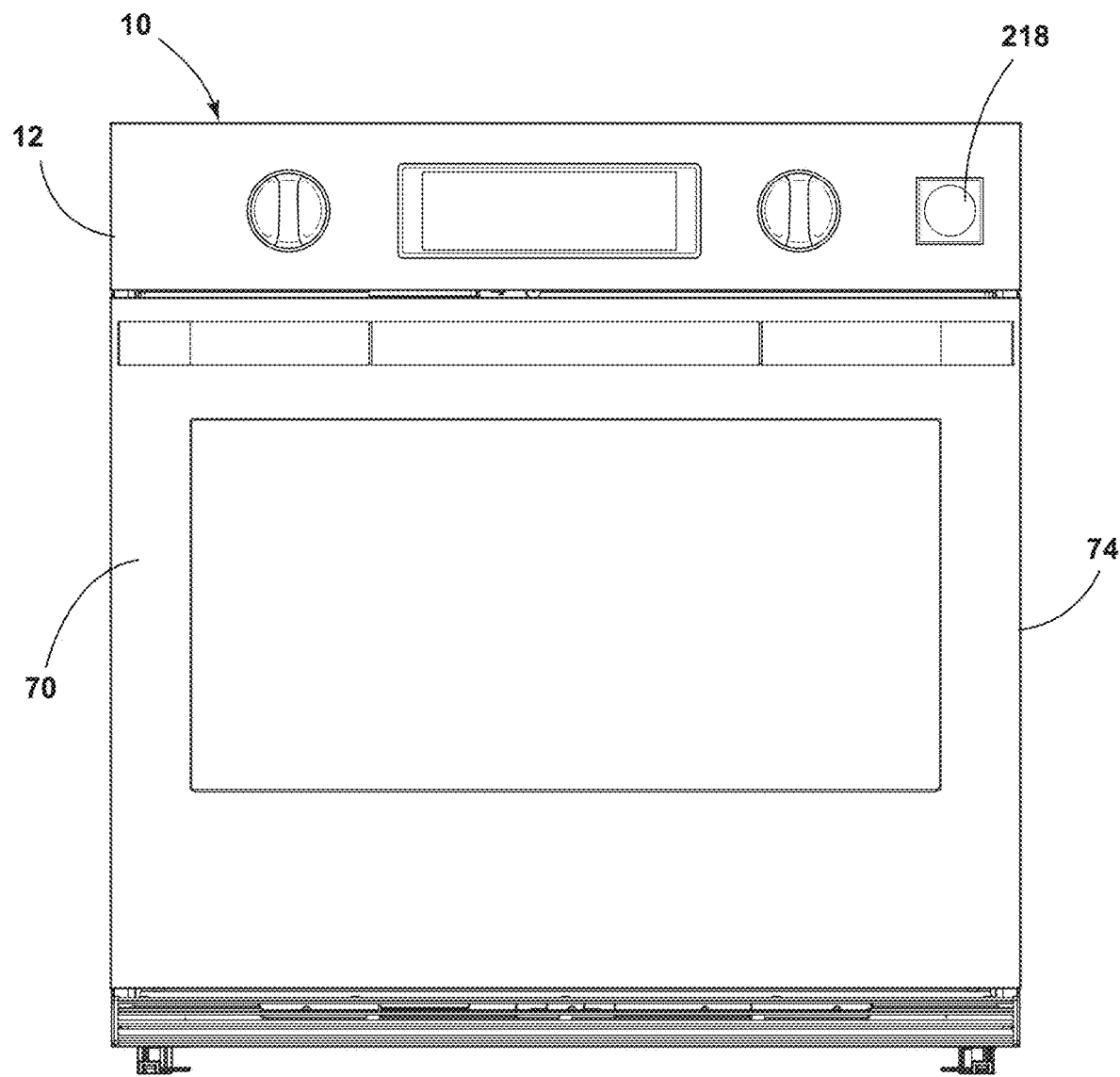
FIG. 1 is a front elevational view of a cooking appliance with a door in a closed position, according to the present disclosure.

The components in the figures are not necessarily to scale, emphasis instead being placed upon illustrating the principles described herein.

DETAILED DESCRIPTION

The present illustrated embodiments reside primarily in combinations of method steps and apparatus components related to an oven rack system. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

With reference to FIGS. 1-16, reference numeral 10 generally designates a cooking appliance. As a body 12 defining a cooking cavity 14. Guide members 16 are coupled to sidewalls 18, 20 within the cooking cavity 14. Guide members 16 define at least a first cooking level 22 and a second cooking level 24. A rack 26 is disposed within the cooking cavity 14. The rack 26 is selectively positionable on the guide members 16. The rack 26 is operable between a stowed position 28 within the cooking cavity 14 and a deployed position 30 extending at least partially out of the cooking cavity 14. An actuator assembly 32 is coupled to a rear wall 34 that defines the cooking cavity 14. The actuator assembly 32 includes a telescoping actuator 36 that is operable between a retracted position 38 and an extended position 40. At least one connector 42 is coupled to the rack 26 and a distal end 44 of the telescoping actuator 36. The rack 26 is adjusted from the stowed position 28 to the deployed position 30 as the telescoping actuator 36 is adjusted from the retracted position 38 to the extended position 40.

Figure 2:
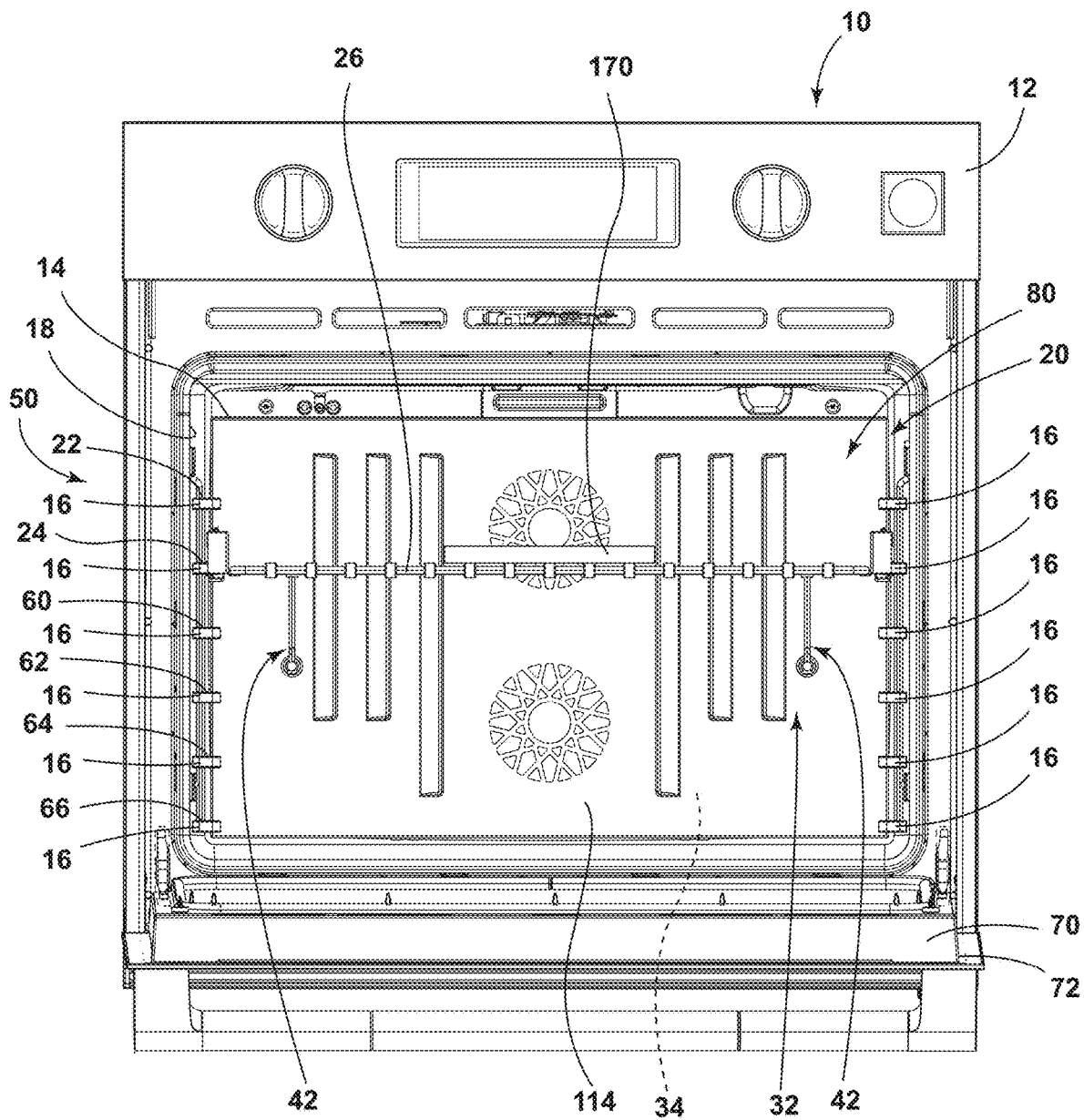
FIG. 2 is a front elevational view of a rack system within a cooking cavity of a cooking appliance, according to the present disclosure.

Referring to FIGS. 1 and 2, the cooking appliance 10 is illustrated as an oven having the cooking cavity 14. The cooking appliance 10 may be any cooking appliance 10 having the cooking cavity 14 with the rack 26 positionable therein. The cooking cavity 14 is partially defined by the sidewalls 18, 20 and the rear wall 34 extending between the sidewalls 18, 20. Multiple guide members 16 are coupled to each sidewall 18, 20. The guide members 16 may be integrally formed with the sidewalls 18, 20, or alternatively, may be incorporated on a separate component, such as a ladder rack, selectively coupled to the sidewalls 18, 20. The guide members 16 support the rack 26 disposed within the cooking cavity 14.

The guide members 16 on the sidewall 18 are horizontally aligned with the guide member 16 and the sidewall 20 to define multiple cooking levels 50. In the illustrated example, the cooking appliance 10 includes six cooking levels 22, 24, 60, 62, 64, 66, which are collectively referred to herein as the cooking levels 50. The cooking levels 22, 24, 60, 62, 64, 66 are arranged at different heights within the cooking cavity 14. The rack 26 may be positioned at and interchanged between any of the cooking levels 50 by a user. The rack 26 may slidably engage the guide members 16 at any cooking level 50 between the stowed position 28 and the deployed position 30.

A door 70 is rotatably coupled to the body 12. The door 70 is operable between an opened position 72 to access the cooking cavity 14 and a closed position 74 to enclose the cooking cavity 14. In certain aspects, the door 70 may be manually adjusted by the user between the opened and closed positions 72, 74.

Figure 3:
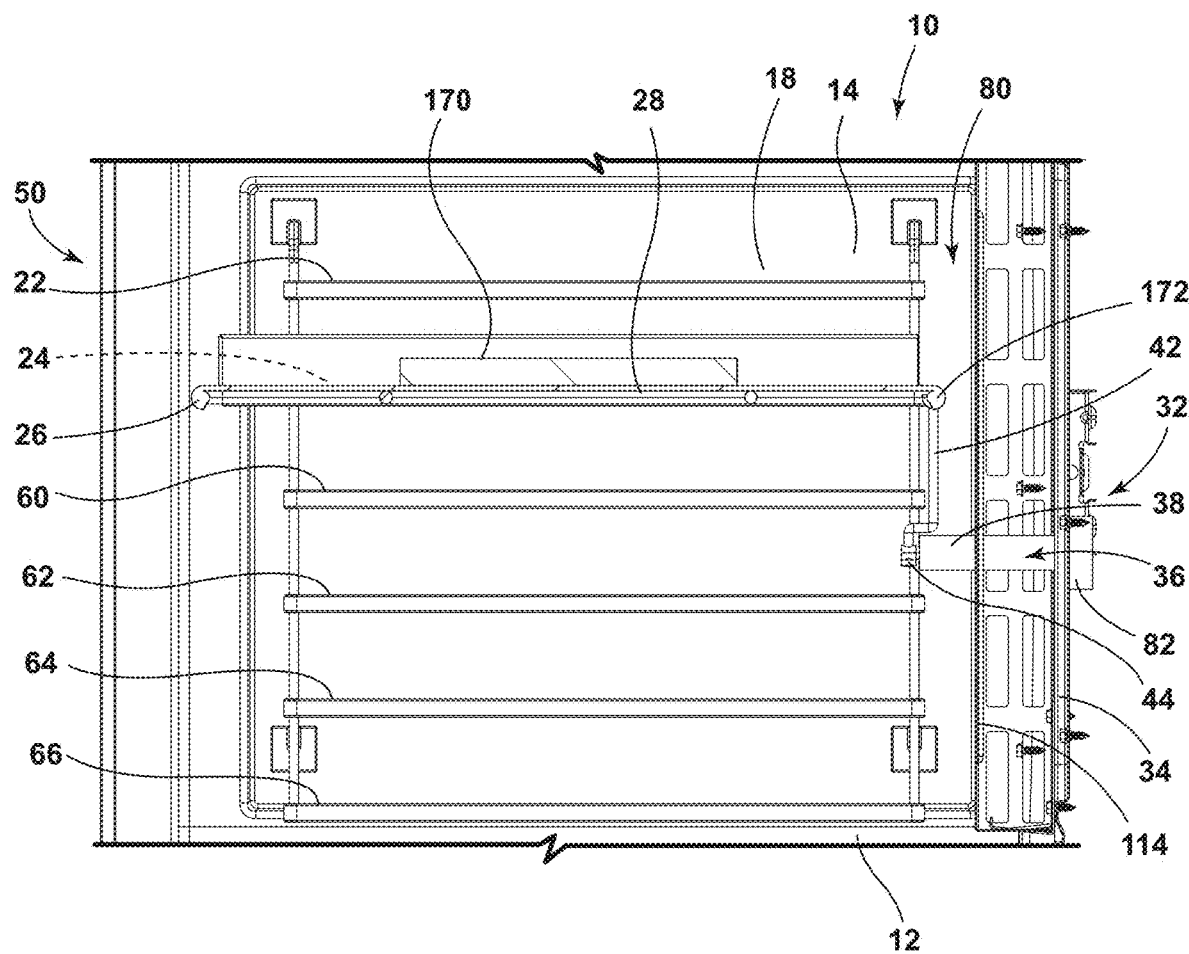
FIG. 3 is a side cross-sectional view of a rack system within a cooking cavity with a rack in a stowed position and an actuator assembly in a retracted position, according to the present disclosure.
Figure 4:
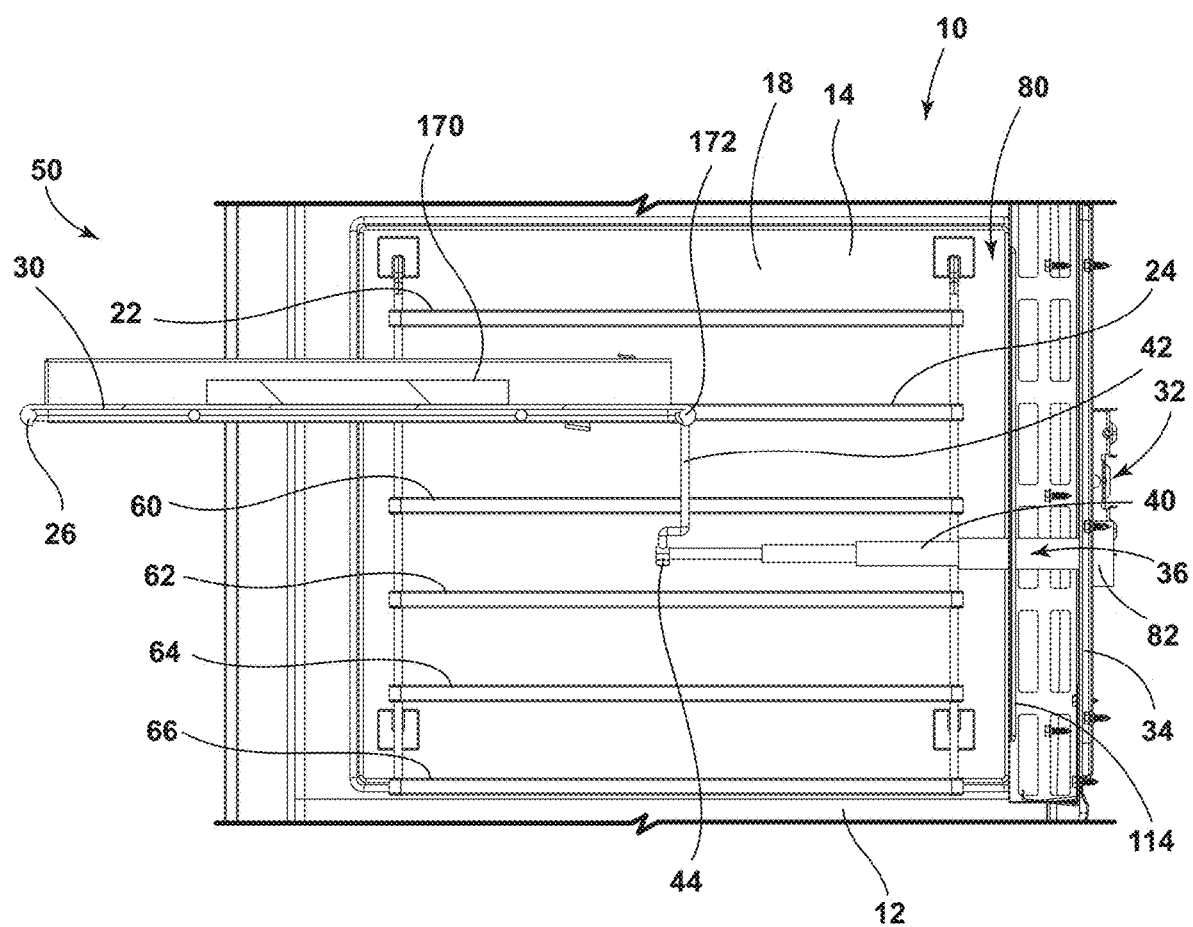
FIG. 4 is a side cross-sectional view of a rack system within a cooking cavity with a rack in a deployed position and an actuator assembly in an extended position, according to the present disclosure.

Referring to FIGS. 3-4, the cooking appliance 10 includes an automatic rack system 80 for automatically adjusting the rack 26 between the stowed position 28, as illustrated in FIG. 3, and the deployed position 30, as illustrated in FIG. 4. The rack system 80 includes the actuator assembly 32 and the rack 26. The actuator assembly 32 includes a motor 82 operably coupled with the telescoping actuator 36. The motor 82 adjusts the telescoping actuator 36 between the retracted position 38, as illustrated in FIG. 3, and the extended position 40, as illustrated in FIG. 4. The telescoping actuator 36 increases in length as the telescoping actuator 36 moves from the retracted position 38, as illustrated in FIG. 3, to the extended position 40, as illustrated in FIG. 4.

The connector 42 extends between the telescoping actuator 36 and the rack 26. The connector 42 allows the rack 26 to move along the guide members 16 when the telescoping actuator 36 is moving. Accordingly, as the telescoping actuator 36 moves from the retracted position 38 to the extended position 40, the rack 26 moves from the stowed position 28 to the deployed position 30. Similarly, the movement of the telescoping actuator 36 from the extended position 40 to the retracted position 38 consequently adjusts the rack 26 from the deployed position 30 to the stowed position 28.

Figure 5A:
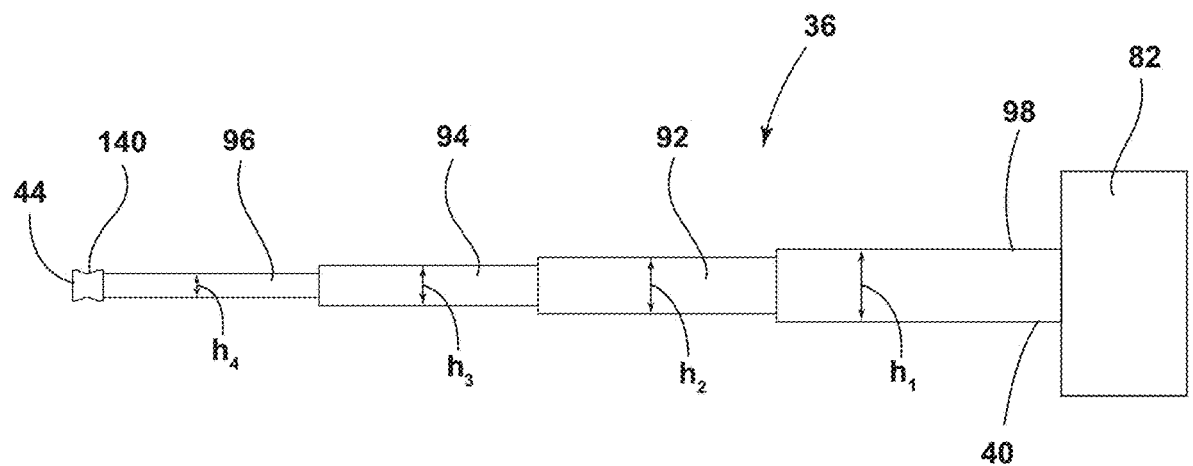
FIG. 5A is a side plan view of a telescoping actuator of a rack system for a cooking appliance in an extended position, according to the present disclosure.
Figure 5B:
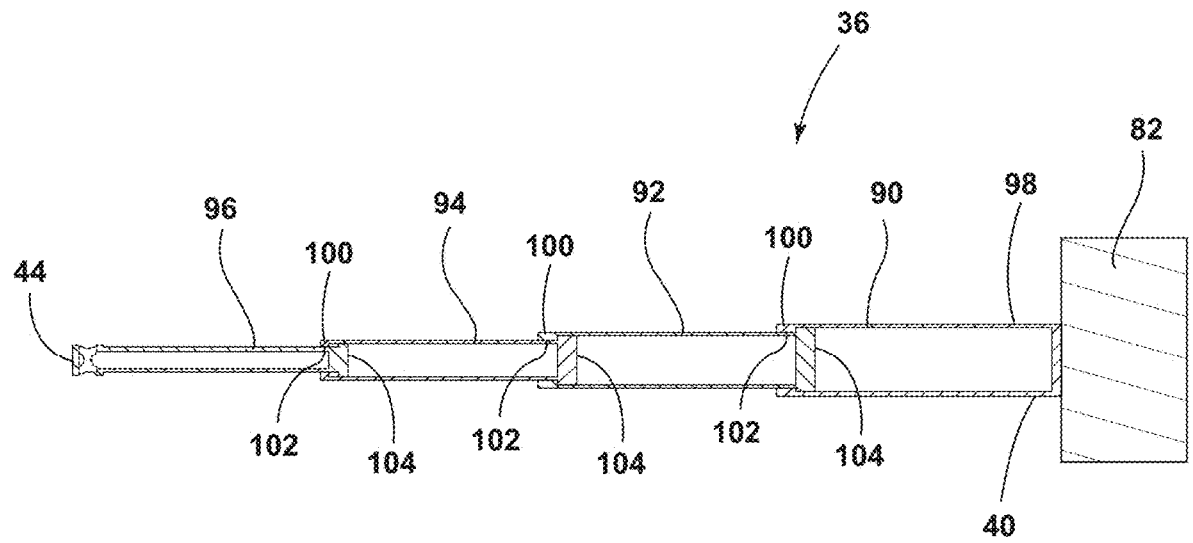
FIG. 5B is a side cross-sectional view of a telescoping actuator of a rack system for a cooking appliance in an extended position, according to the present disclosure.

Referring to FIGS. 5A and 5B, the telescoping actuator 36 includes multiple segments 90, 92, 94, 96. The first segment 90 is a proximal end 98 of the telescoping actuator 36 disposed proximate to the motor 82. The first segment 90 has a height $h_1$ that is greater than the height $h_1$, $h_2$, $h_3$ of each of the other segments 92, 94, 96. The height of the segments 90, 92, 94, 96 decreases from the proximal end 98 to the distal end 44 of the telescoping actuator 36. It is contemplated that a width of each segment 90, 92, 94, 96 has a similar relationship as the height.

The segments 90, 92, 94 each include a retaining feature 100 at one end thereof. The retaining feature 100 extends into an interior of the respective segments 90, 92, 94 proximate to an opening 102 for accommodating the adjacent segment 92, 94, 96, respectively. The segments 92, 94, 96 each include a stop feature 104 on a second end thereof that is configured to abut the retaining feature 100 when the telescoping actuator 36 is in the extended position 40.

Figure 6A:
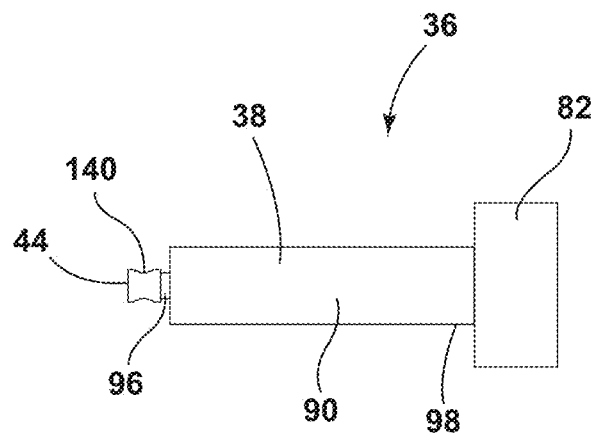
FIG. 6A is a side plan view of a telescoping actuator of a rack system for a cooking appliance in a retracted position, according to the present disclosure.
Figure 6B:
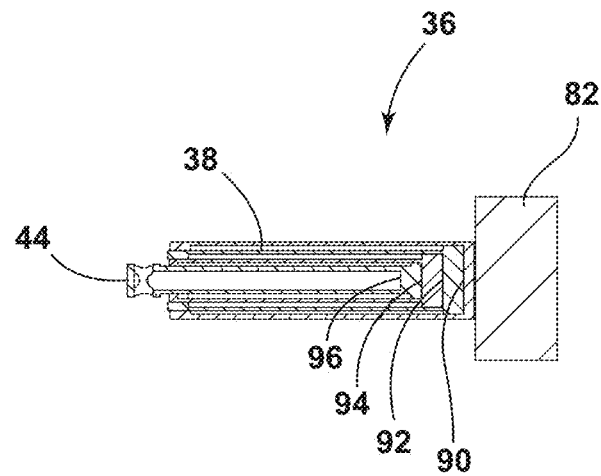
FIG. 6B is a side cross-sectional view of a telescoping actuator of a rack system for a cooking appliance in a retracted position, according to the present disclosure.

Referring to FIGS. 6A and 6B, each of the segments 90, 92, 94, 96 may have a substantially hollow interior to allow the smaller segments 92, 94, 96 to be housed within the interior of the adjacent segment 90, 92, 94, respectively. The segment 96 may be nested into the segment 94, which may be nested into the segment 92. The segment 92 may be nested inside the segment 90. When in the fully retracted position 38, each of the stop features 104 may be disposed adjacent to one another. The telescoping actuator 36 may retract inwards until a length of the telescoping actuator 36 in the retracted position 38 is slightly larger than the combined length of the segment 90 and the motor 82.

Referring again to FIGS. 5A-6B, when the telescoping actuator 36 is activated, the distal end 44 on the fourth segment 96 may be adjusted first, moving away from the motor 82 until the stop feature 104 engages the retaining feature 100 of the third segment 94. This engagement may cause or trigger the movement of the third segment 94. The third segment 94 may continue to move until the stop feature 104 of the third segment 94 engages the retaining feature 100 of the second segment 92. This engagement may then cause or trigger the movement of the second segment 92, which may move until the stop feature 104 of the second segment 92 engages the retaining feature 100 of the first segment 90 resulting in the telescoping actuator 36 being in the fully extended position 40.

When the telescoping actuator 36 is activated to be adjusted to the retracted position 38, the fourth segment 96 may move first into the third segment 94, causing a cascading collapse of the telescoping actuator 36. The third segment 94 may then move into the second segment 92, which then moves into the first segment 90. In another non-limiting example, the second segment 92 may be adjusted into the first segment 90, followed by the third segment 94 moving into the second segment 92, and the fourth segment 96 moving into the third segment 94 until the telescoping actuator 36 is fully retracted. It is contemplated that different movement patterns of the segments 90, 92, 94, 96 may be utilized to adjust the telescoping actuator 36 between the stowed position 28 and the deployed position 30 without departing from the teachings herein.

When fully retracted, as illustrated in FIGS. 6A and 6B, the first segment 90 and the distal end 44 may be visible within the cooking cavity 14 (FIG. 1). The remainder of the fourth segment 96 as well as the second and third segments 92, 94 may be substantially obscured within the interior of the first segment 90. The distal end 44 may remain exposed when the telescoping actuator 36 is in the retracted position 38 and coupled with the connector 42 as described further herein.

Figure 7:
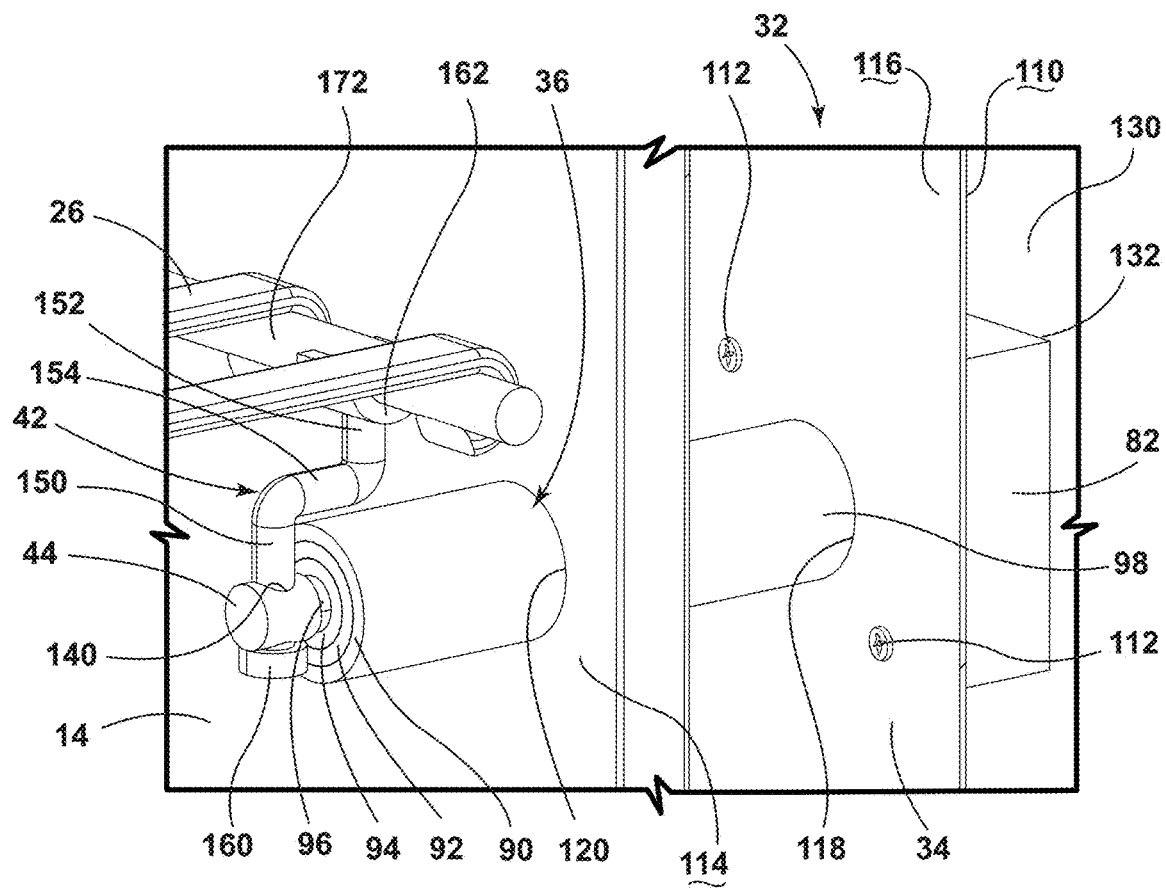
FIG. 7 is a side perspective view of an actuator assembly with a telescoping actuator coupled to a rack via a connector, according to the present disclosure.

Referring to FIG. 7, the actuator assembly 32 is coupled to the rear wall 34 and extends partially into the cooking cavity 14. The telescoping actuator 36 extends into the cooking cavity 14, while the motor 82 remains outside of the cooking cavity 14. The motor 82 generally abuts an exterior surface 110 of the rear wall 34. The motor 82 may be coupled to the rear wall 34 via fasteners 112, such as screws, nails, pins, or other coupling members. In various examples, a baffle 114 may be disposed within the cooking cavity 14 and proximate to an interior surface 116 of the rear wall 34. When the door 70 is in the opened position 72, the baffle 114 may substantially obscure the rear wall 34 from view. It is contemplated that the cooking appliance 10 may not include the baffle 114 without departing from the teachings herein.

The telescoping actuator 36 extends from the motor 82 outside the cooking cavity 14, through the rear wall 34, and through the baffle 114. The rear wall 34 defines an aperture 118, and the telescoping actuator 36 extends through the aperture 118. The aperture 118 may be sized to accommodate the size and shape of the first segment 90 of the telescoping actuator 36. The rear wall 34 may abut an outer surface of the telescoping actuator 36 to minimize a space between the rear wall 34 and the telescoping actuator 36. It is contemplated that a sealing feature may be disposed around the engagement between the telescoping actuator 36 and the rear wall 34 to reduce warmed air escaping from the cooking cavity 14.

The baffle 114 defines an aperture 120 that aligns with the aperture 118 defined by the rear wall 34. Generally, the first segment 90 extends through each aperture 118, 120 and into the cooking cavity 14. The aperture 118 may be sized and shaped to abut the outer surface of the first segment 90.

Referring still to FIG. 7, the cooking appliance 10 includes an insulation layer 130 disposed outside of the cooking cavity 14 proximate to the exterior surface 110 of the rear wall 34. The motor 82 extends through the insulation layer 130. Accordingly, the insulation layer 130 defines an opening 132 to accommodate the motor 82. In the illustrated example, the motor 82 is rectangular, and the opening 132 may also be rectangular.

Figure 8:
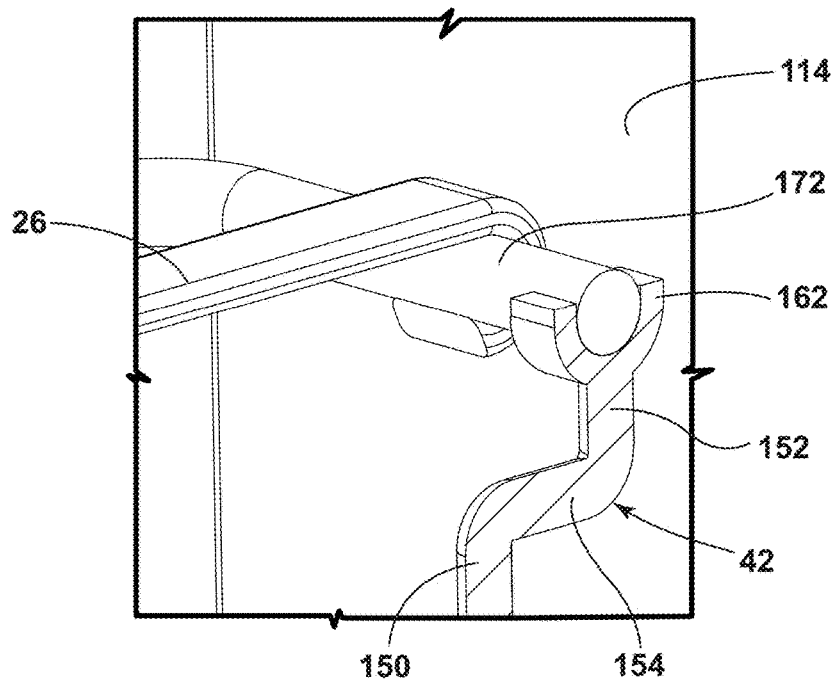
FIG. 8 is a side cross-sectional perspective view of a connector of an actuator assembly for a rack system engaging a rack, according to the present disclosure.

Referring still to FIG. 7, as well as FIG. 8, the distal end 44 of the telescoping actuator 36 remains exposed when the telescoping actuator 36 is in the retracted position 38. The distal end 44 defines an aperture 140 that extends vertically through the distal end 44. The orientation of the aperture 140 remains consistent (e.g., remains vertically oriented) as the telescoping actuator 36 is adjusted between the retracted and extended positions 38, 40. The actuator assembly 32 includes the connector 42, which extends between the telescoping actuator 36 and the rack 26. The connector 42 includes a first end 150 coupled to the telescoping actuator 36, a second end 152 coupled to the rack 26, and a center 154 extending between the first and second ends 150, 152. Generally, the first end 150 and the second end 152 extend vertically while the center 154 extend substantially horizontally. In the illustrated example, the second end 152, is disposed closer to the baffle 114 relative to the first end 150.

Other configurations or orientations of the connector 42 are contemplated without departing from the teachings herein.

The first end 150 extends through the aperture 140 in the distal end 44 of the telescoping actuator 36. A nut 160 is coupled to the first end 150 on an opposing side of the telescoping actuator 36 relative to the rack 26. The nut 160 may operate to secure the connector 42 to the telescoping actuator 36.

The second end 152 of the connector 42 includes a coupling feature 162 configured to selectively engage the rack 26. The user may selectively engage and disengage the coupling feature 162 with the rack 26. In certain aspects, the coupling feature 162 is configured as a snap feature to snap engage the rack 26. In the illustrated configuration, the rack 26 includes multiple wires for supporting a food item 170 (FIG. 2) thereon. The rack 26 includes an inner edge 172 disposed proximate to the baffle 114. The coupling feature 162 engages the inner edge 172 of the rack 26 to couple the rack 26 to the telescoping actuator 36. The coupling feature 162 and the rack 26 may have different configurations without departing from the teachings herein.

Figure 9:
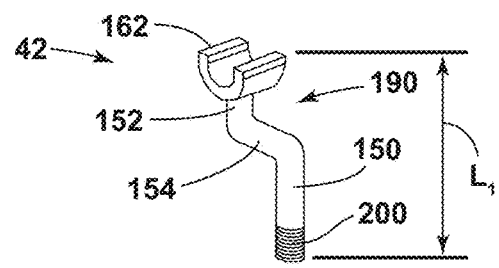
FIG. 9 is a side perspective view of a first connector for a rack system, according to the present disclosure.
Figure 10A:
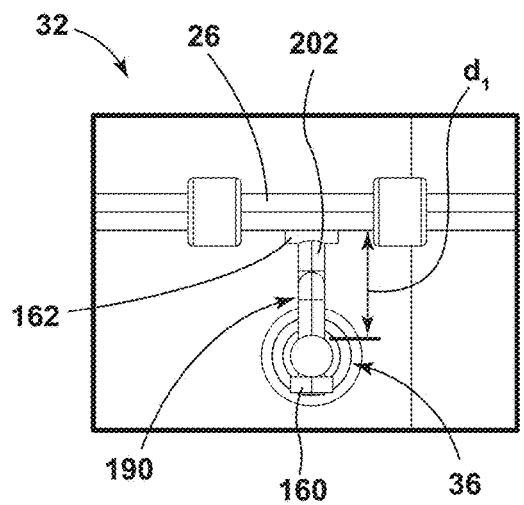
FIG. 10A is a front elevational view of the first connector of FIG. 9 in a first position extending between an actuator and a rack above the actuator, according to the present disclosure.
Figure 10B:
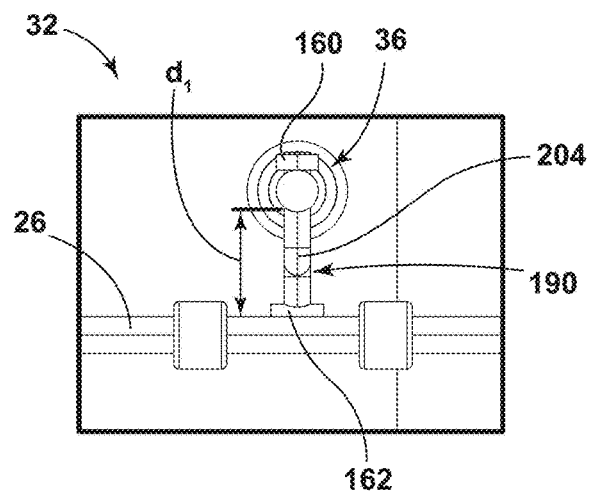
FIG. 10B is a front elevational view of the first connector of FIG. 9 in a second position extending between an actuator and a rack below the actuator, according to the present disclosure.
Figure 11:
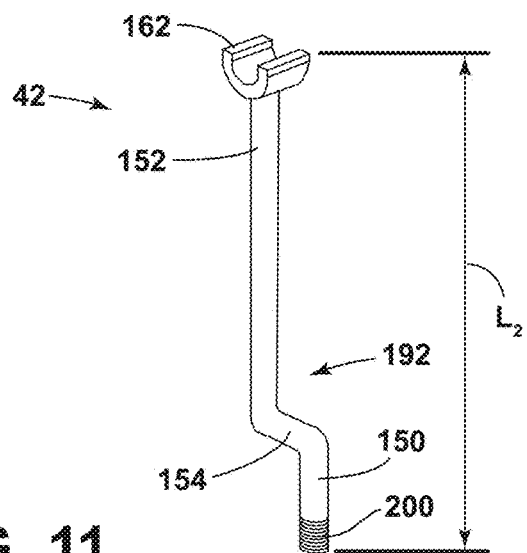
FIG. 11 is a side perspective view of a second connector for a rack system, according to the present disclosure.
Figure 12A:
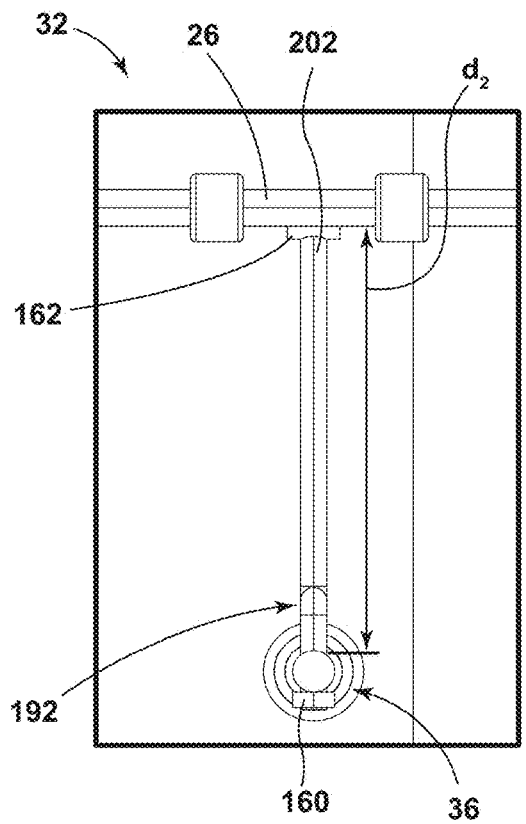
FIG. 12A is a front elevational view of the second connector of FIG. 11 in a first position extending between an actuator and a rack above the actuator, according to the present disclosure.
Figure 12B:
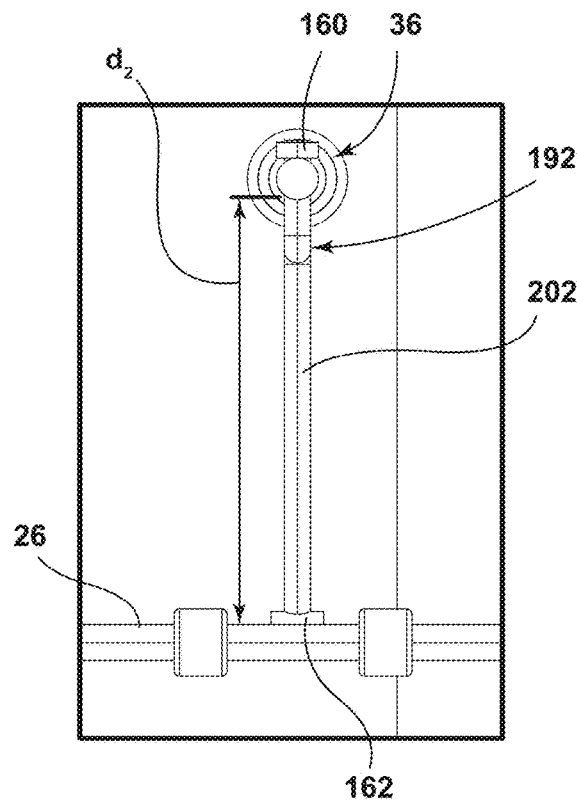
FIG. 12B is a front elevational view of the second connector of FIG. 11 in a second position extending between an actuator and a rack below the actuator, according to the present disclosure.
Figure 13:
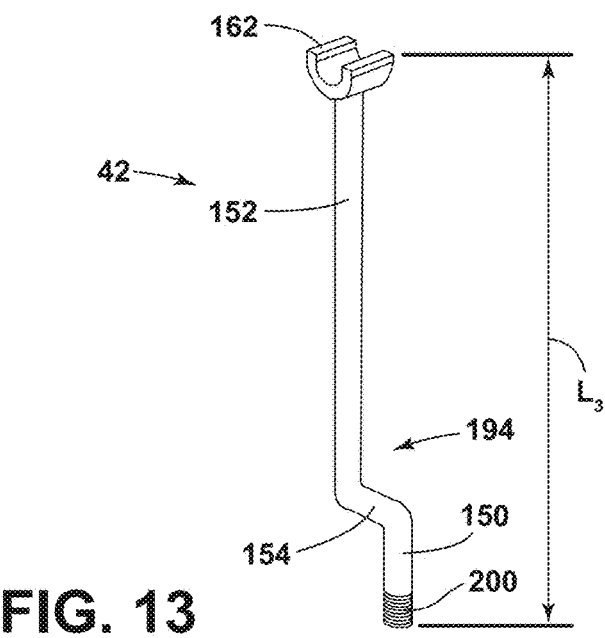
FIG. 13 is a side perspective view of a third connector for a rack system, according to the present disclosure.

Referring to FIGS. 9-17, the connector 42 may have a variety of configurations. The connector 42 may be configured as a first connector 190, as illustrated in FIG. 9, a second connector 192, as illustrated in FIG. 11, or a third connector 194, as illustrated in FIG. 13, which are collectively referred to herein as the connectors 42. Each of the connectors 190, 192, 194 are included in the rack system 80 and are interchangeable with one another. Additionally, the connectors 190, 192, 194 have differing lengths $L_1$, $L_2$, $L_3$. Specifically, the second ends 152 of the connectors 190, 192, 194, between the center 154 and the coupling feature 162, have different lengths. The first end 150 of each connector 190, 192, 194 includes threads 200 for engaging the nut 160, and the second end 152 of each connector 190, 192, 194 includes the coupling feature 162.

Each of the connectors 190, 192, 194 can be utilized in each of a first position 202, extending in a first direction, and a second position 204, extending in a second opposing direction. When in the first position 202, the second end 152 and the coupling feature 162 are disposed vertically above the telescoping actuator 36, while the threads 200 on the first end 150 are disposed below the telescoping actuator 36. Accordingly, the nut 160 is disposed below the telescoping actuator 36. When in the second position 204, the second end 152 and the coupling feature 162 are disposed vertically below the telescoping actuator 36, while the threads 200 on the first end 150 are disposed above the telescoping actuator 36. Accordingly, the nut 160 is disposed above the telescoping actuator 36. The nut 160 is generally disposed proximate or adjacent to the telescoping actuator 36. A distance between the telescoping actuator 36 and the coupling feature 162, and consequently the rack 26, differs depending on which connector 190, 192, 194 is used.

Referring still to FIGS. 9-10B, the first connector 190 has the length $L_1$, which may be the shortest length of the connectors 190, 192, 194. The first end 150 of the first connector 190 is generally longer than the second end 152. As illustrated in FIG. 10A, when in the first position 202, the first connector 190 extends vertically up from the telescoping actuator 36 to engage the rack 26. When in the second position 204, as illustrated in FIG. 10B, the first connector 190 extends vertically downward from the telescoping actuator 36 to engage rack 26. The first connector 190 extends a same distance $d_1$ from the telescoping actuator 36 when in each of the first position 202 and the second position 204.

Referring again to FIGS. 11-12B, the second connector 192 has the length $L_2$, which is greater than the length $L_1$ of the first connector 190. As illustrated in FIG. 11, the second end 152 of the second connector 192 is longer than the first end 150. The second connector 192 extends a greater distance $d_2$ from the telescoping actuator 36 relative to the first connector 190. The increased length of the second end 152 allows for the greater extension from the telescoping actuator 36.

As illustrated in FIG. 12A, when in the first position 202, the second connector 192 extends vertically up from the telescoping actuator 36 to engage the rack 26. As illustrated in FIG. 12B, when in the second position 204, the telescoping actuator 36 extends vertically downward to engage the rack 26. The second connector 192 extends a same distance $d_2$ from the telescoping actuator 36 when in each of the first position 202 and the second position 204.

Figure 14A:
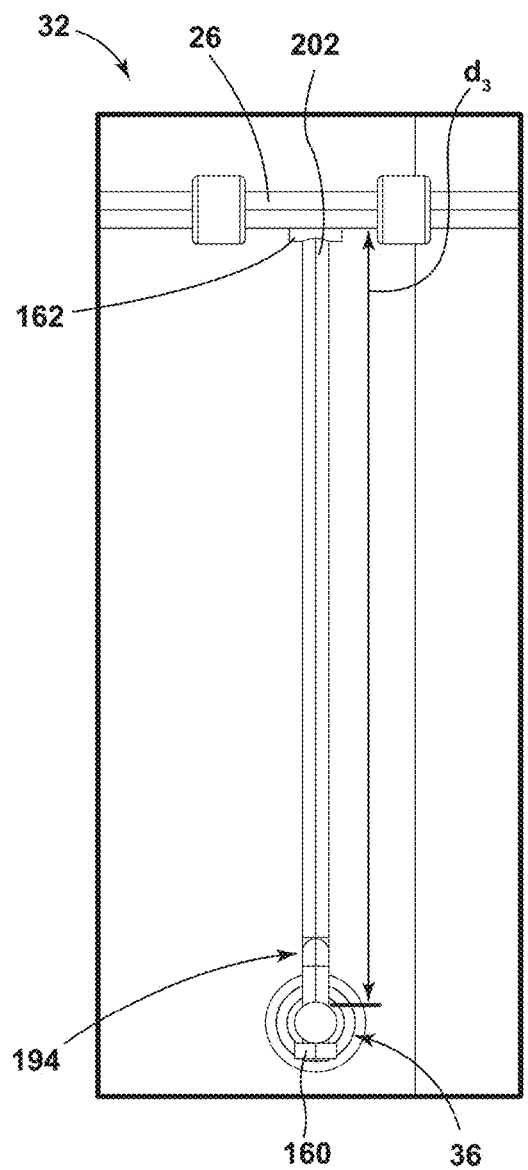
FIG. 14A is a front elevational view of the third connector of FIG. 13 in a first position extending between an actuator and a rack above the actuator, according to the present disclosure.
Figure 14B:
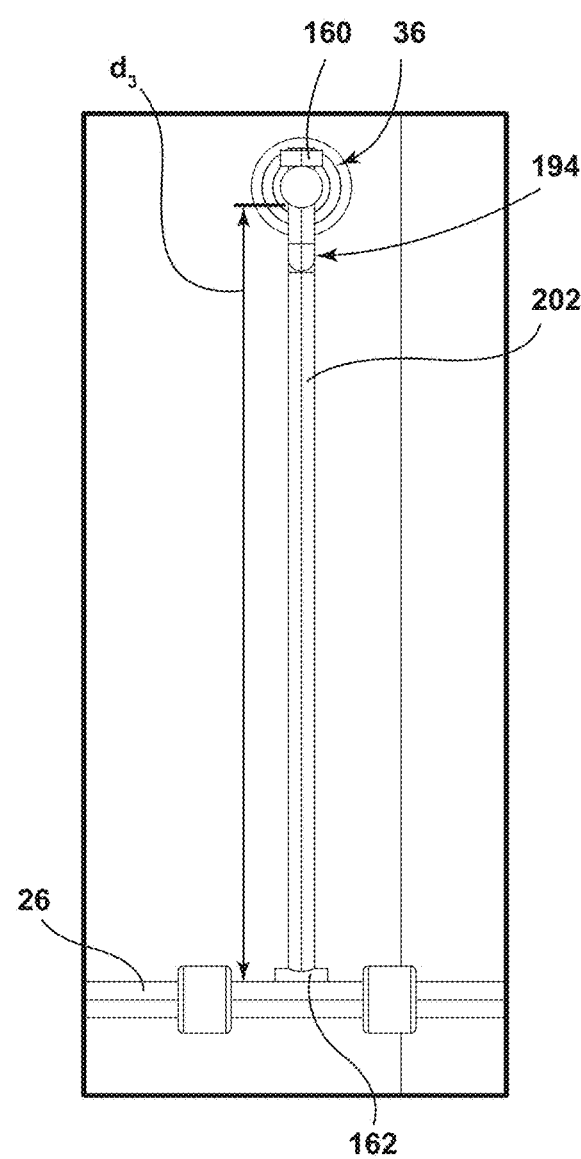
FIG. 14B is a front elevational view of the third connector of FIG. 13 in a second position extending between an actuator and a rack below the actuator, according to the present disclosure.

Referring to FIG. 13-14A, the third connector 194 has the length $L_3$, which may be greater than both the length $L_2$ and the length $L_1$. The second end 152 of the third connector 194 is the longest of the connectors 190, 192, 194. Accordingly, the third connector 194 extends a greatest distance $d_3$ from the telescoping actuator 36. As illustrated, in FIG. 14A, when in the first position 202, the third connector 194 extends vertically up from the telescoping actuator 36 to engage the rack 26. When in the second position 204, as illustrated in FIG. 14B, the third connector 194 extends vertically downward from the telescoping actuator 36 to engage the rack 26. The third connector 194 extends the same distance $d_3$ from the telescoping actuator 36 when in each of the first position 202 and the second position 204.

Referring to FIGS. 15A-15F, the rack system 80 includes each of the first connector 190, the second connector 192, and the third connector 194. The connectors 190, 192, 194 are generally interchangeable with one another, depending on the cooking level 50 at which the rack 26 is disposed. The varying distances $d_1$, $d_2$, $d_3$ that the connectors 190, 192, 194 extend, respectively, from the telescoping actuator 36 provide for the connection between the rack 26 and the telescoping actuator 36 at any of the cooking levels 50 in the cooking cavity 14.

The telescoping actuator 36 is generally disposed at a central location relative to the cooking levels 50. As previously stated, there are six cooking levels 22, 24, 60, 62, 64, 66 in the illustrated configuration. Three cooking levels 22, 24, 60 are above the telescoping actuator 36 and the remaining three cooking level 62, 64, 66 are below the telescoping actuator 36. Additional or fewer cooking levels 50 may be included in the cooking cavity 14 without departing from the teachings herein.

Figure 15A:
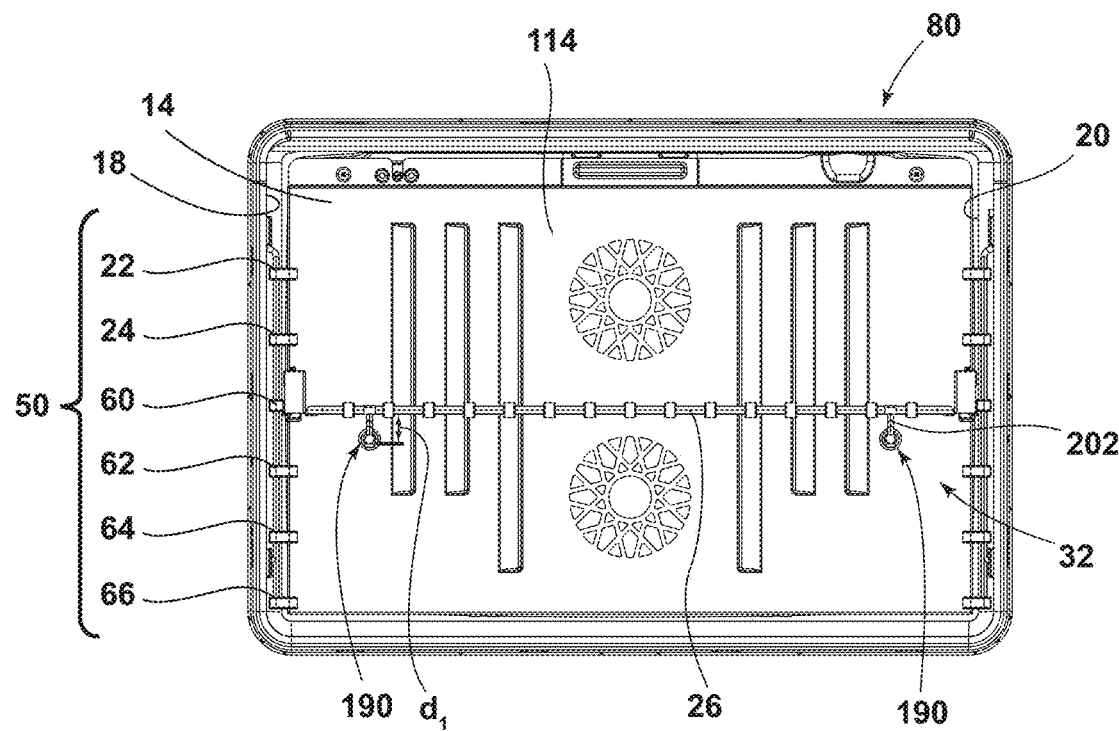
FIG. 15A is a front elevational view of a rack system with rack disposed above an actuator in a cooking cavity with a first connector arranged in a first position and extending between the rack and the actuator, according to the present disclosure.
Figure 15B:
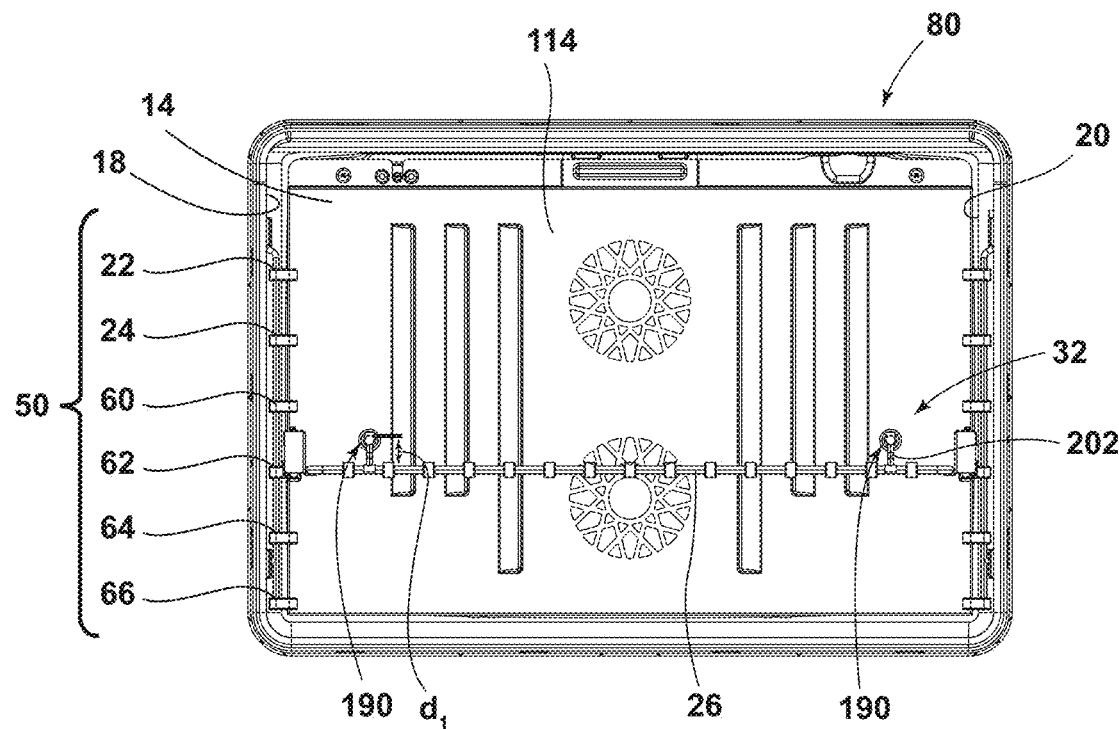
FIG. 15B is a front elevational view of a rack system with a rack disposed above below an actuator in a cooking cavity with a first connector arranged in a second position and extending between the rack and the actuator, according to the present disclosure.

As illustrated in FIGS. 15A and 15B, the first connector 190, having the shortest length $L_1$ and extending the shortest distance $d_1$ from the telescoping actuator 36, is utilized when the rack 26 is disposed at either the third cooking level 60 or the fourth cooking level 62. The cooking levels 60, 62 are closest to the centralized location of the telescoping actuator 36. The first connector 190 is disposed in the first position 202 when the rack 26 is on the third cooking level 60. When the rack 26 is at the fourth cooking level 62, the first connector 190 is disposed in the second position 204. The same connector 190 may be used for two cooking levels 60, 62 each the same distance $d_1$ from the telescoping actuator 36.

Figure 15C:
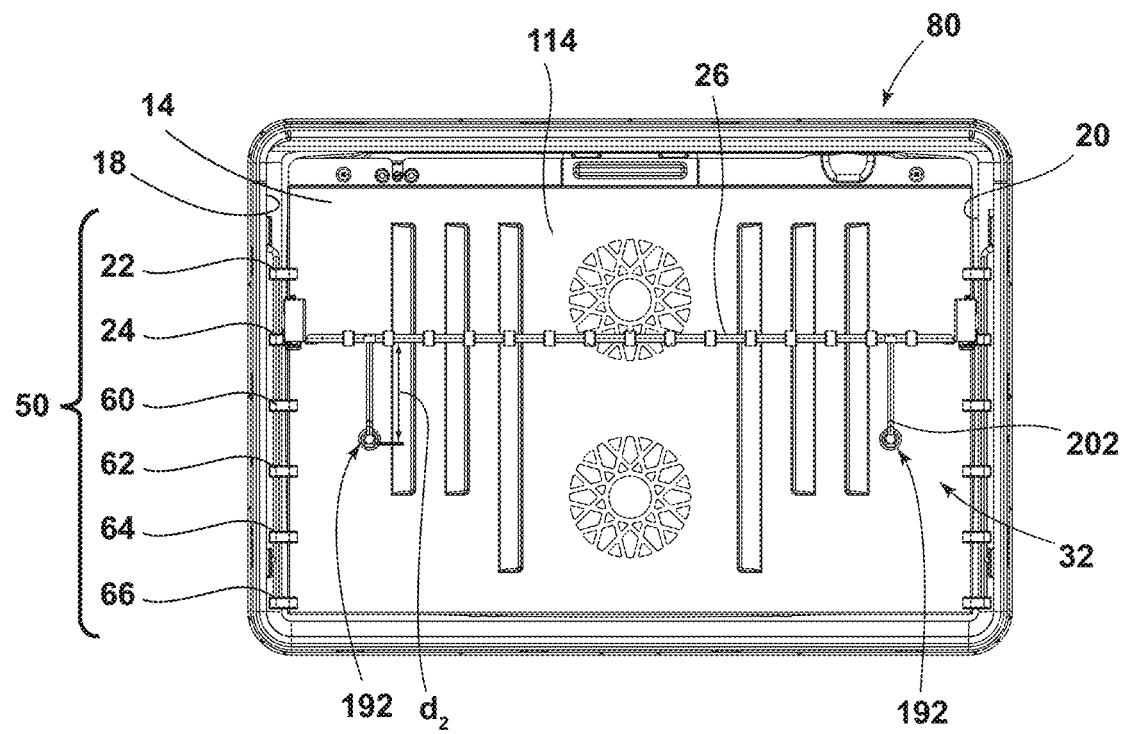
FIG. 15C is a front elevational view of a rack system with a rack disposed above an actuator in a cooking cavity with a second connector arranged in a first position and extending between the rack and the actuator, according to the present disclosure.
Figure 15D:
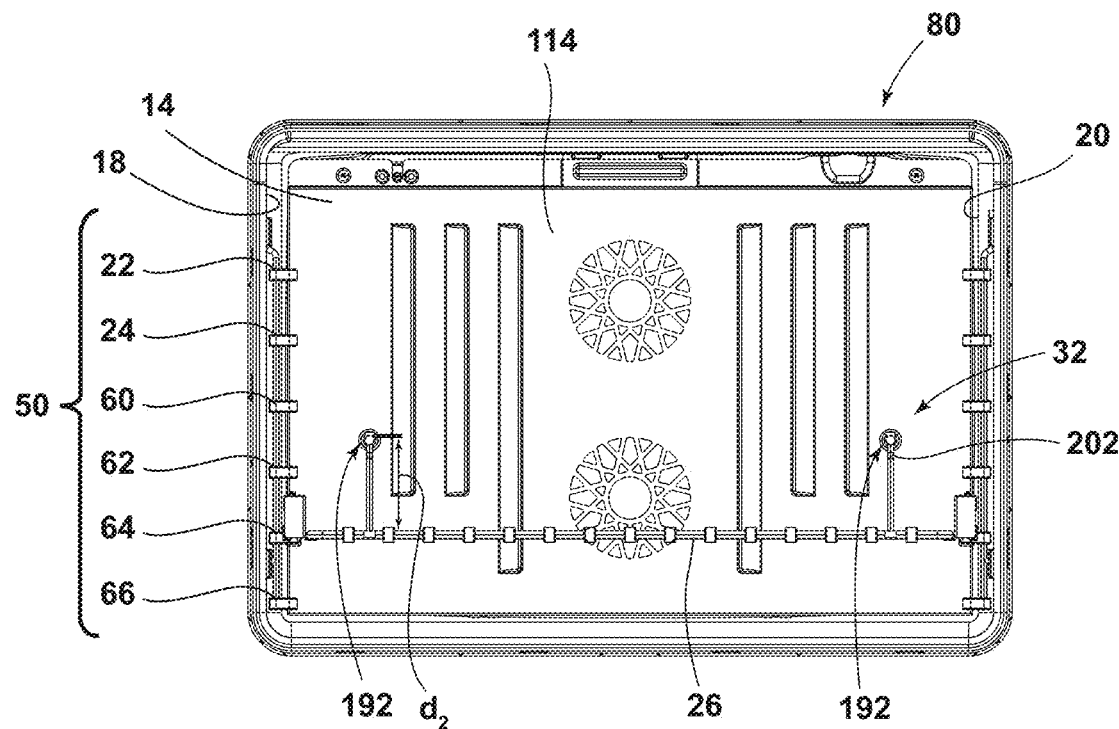
FIG. 15D is a front elevational view of a rack system with a rack disposed above below an actuator in a cooking cavity with a second connector arranged in a second position and extending between the rack and the actuator, according to the present disclosure.

As best illustrated in FIGS. 15C and 15D, the second connector 192 is utilized when the rack 26 is positioned at either of the second cooking level 24 or the fifth cooking level 64. The second and fifth cooking levels 24, 64 are disposed a further distance $d_2$ from the telescoping actuator 36 relative to the third and fourth cooking levels 60, 62. Accordingly, the second connector 192, having the greater length $L_2$ and extending the greater distance $d_2$ from the telescoping actuator 36 is used in conjunction with the rack 26 on the second and fifth cooking levels 24, 64. When the rack 26 is disposed at the second cooking level 24, the second connector 192 is in the first position 202 to engage the rack 26, as illustrated in FIG. 15C. As illustrated in FIG. 15D, when the rack 26 is disposed of the fifth cooking level 64, the second connector 192 is disposed at the second position 204. The same connector 192 may be used for two cooking levels 24, 64 each the same distance $d_2$ from the telescoping actuator 36.

Figure 15E:
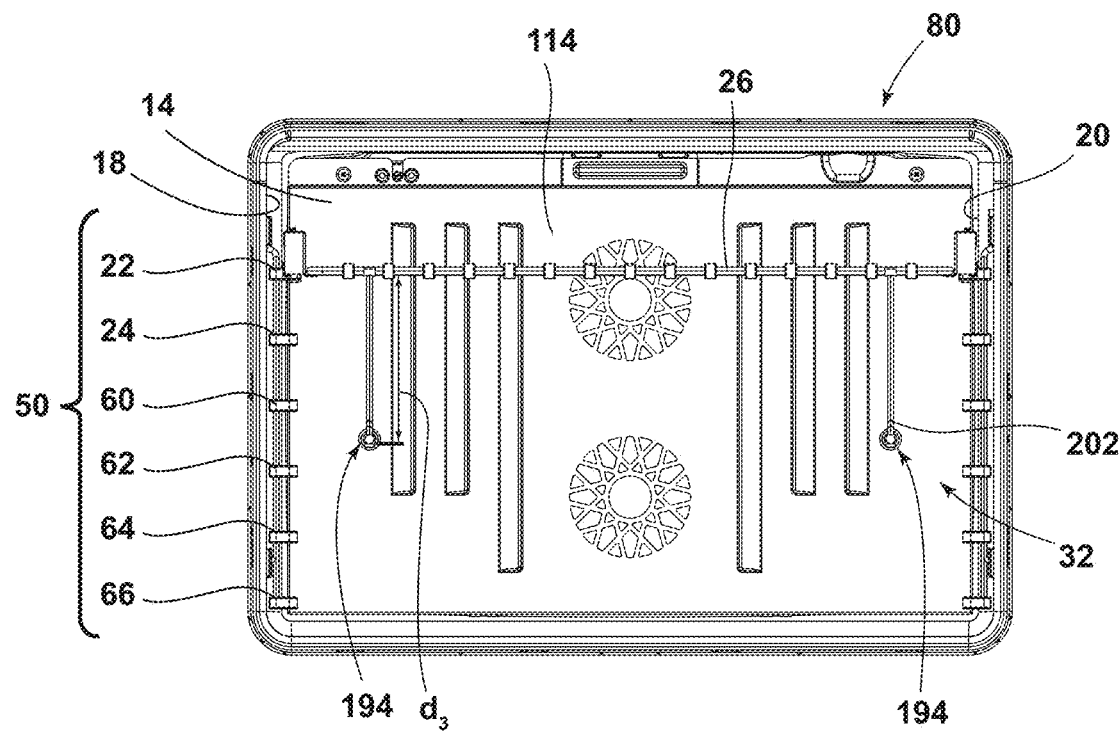
FIG. 15E is a front elevational view of a rack system with a rack disposed above an actuator in a cooking cavity with a third connector arranged in a first position and extending between the rack and the actuator, according to the present disclosure.
Figure 15F:
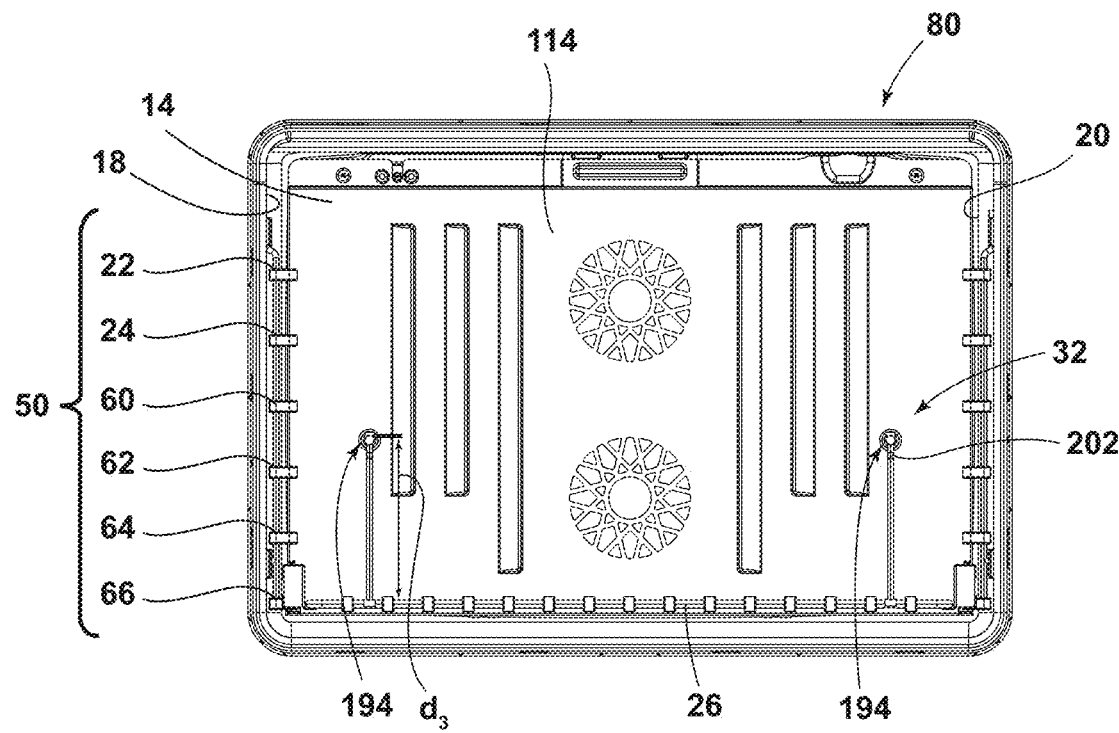
FIG. 15F is a front elevational view of a rack system with a rack disposed below an actuator in a cooking cavity with a third connector arranged in a second position and extending between the rack and the actuator, according to the present disclosure.

As illustrated in FIGS. 15E and 15F, when the rack 26 is positioned at either of the first cooking level 22 or the sixth cooking level 66, the rack 26 is positioned the greatest distance $d_3$ from the telescoping actuator 36. The third connector 194, having the greatest length $L_3$ and extending the greatest distance $d_3$ from the telescoping actuator 36, couples the rack 26 with the telescoping actuator 36 when the rack 26 is at the first or sixth cooking level 22, 66. When the rack 26 is at the first cooking level 22, the third connector 194 is in the first position 202, as illustrated in FIG. 15E. When the rack 26 is at the sixth cooking level 66, the third connector 194 is in the second position 204, as illustrated in FIG. 15F. The same connector 194 may be used for two cooking levels 22, 66 each the same distance $d_3$ from the telescoping actuator 36.

Referring to FIGS. 1-15F, the interchangeability of the connectors 190, 192, 194 allows the rack 26 to be coupled to the telescoping actuator 36 at any of the cooking levels 50 within the cooking cavity 14. The user may change which connector 190, 192, 194 is currently in use in the cooking appliance 10. For example, the first connector 190 may be coupled to the telescoping actuator 36 when the rack 26 on the third cooking level 60. The user may disengage the rack 26 from the first connector 190. The rack 26 may be disengaged when in the stowed position 28 or the deployed position 30. It may be advantageous to disengage the rack 26 when the rack 26 is in the deployed position 30 as the user may not reach into the cooking cavity 14 as far. Further, it may be easier to access the first connector 190 when the telescoping actuator 36 is in the extended position 40 rather than the retracted position 38.

Once the rack 26 is disengaged, the user may place the rack 26 on the new cooking level 50, for example, the first cooking level 22. The user may then disengage the first connector 190 from the telescoping actuator 36. The nut 160 may be loosened and disengaged from the first end 150 of the first connector 190. The first connector 190 may then be removed from the aperture 140 in the distal end 44 of the telescoping actuator 36. The user may then retrieve the third connector 194, which is used when the rack 26 is positioned at the first cooking level 22. The first end 150 of the third connector 194 is inserted through the aperture 140 to expose the threads 200. The nut 160 may be engaged with the threads 200 to retain the third connector 194 to the telescoping actuator 36. The coupling feature 162 of the third connector 194 may then engage the rack 26. The user may then utilize the actuator assembly 32 with the rack 26 in the first cooking level 22.

The actuator assembly 32 generally includes two telescoping actuators 36 each coupled with a separate motor 82. One telescoping actuator 36 is coupled to a first lateral side of the inner edge 172 of the rack 26 while the second telescoping actuator 36 engages a second lateral side of the inner edge 172 (e.g., first and second side actuators 36). The telescoping actuators 36 are horizontally aligned with one another. Additionally, the actuator assembly 32 includes two connectors 42, with one connector 42 engaging each telescoping actuator 36. In this way, the actuator assembly 32 may be coupled to the rack 26 at two locations to assist in adjusting the rack 26 between the stowed position 28 and the deployed position 30. The two connectors 42 may include two first connectors 190, two second connectors 192, or two third connectors 194 depending on the cooking level 50 of the rack 26. The two connectors 42 allow force (e.g., pushing or pulling force) to be evenly applied to the rack 26. Further, two engagement points may result in an even adjustment of the rack 26 along the guide members 16 on each of the sidewalls 18, 20. Additionally, the two engagement points may minimize unequal sliding on the guide members 16 on the sidewall 18 relative to the guide members 16 on the sidewall 20, which may minimize twisting of the rack 26 during movement.

Figure 16:
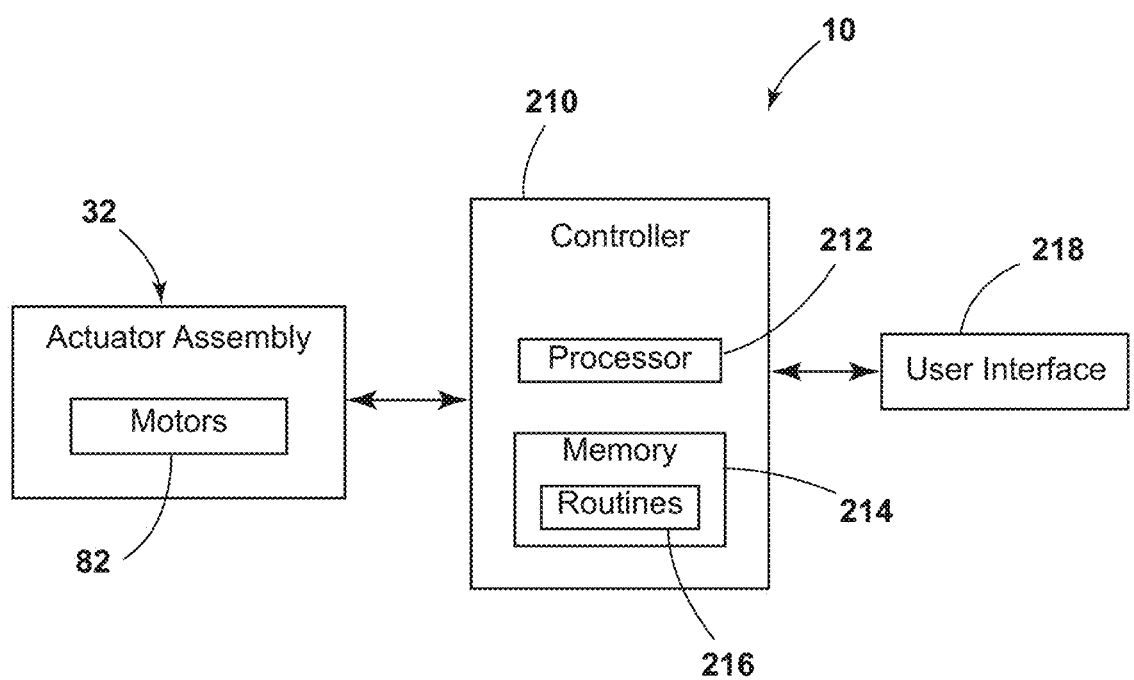
FIG. 16 is a block diagram of a cooking appliance with an automatic rack system, according to the present disclosure.

Referring to FIG. 16, as well as to FIGS. 1-15F, the cooking appliance 10 includes a controller 210 that has a processor 212, a memory 214, and other control circuitry. Instructions or routines 216 are stored within the memory 214 and executable by the processor 212. The controller 210 is in communication with the motors 82 of the actuator assembly 32 to activate the motors 82. The controller 210 is also in communication with a user interface 218. The user interface 218 may include selectable features related to controlling the rack system 80. The selectable features may be touch-sensitive features, switches, buttons, knobs, or other selection features.

In operation, the user rotates the door 70 to the opened position 72. Once the door 70 is in the opened position 72, the user may input a control command into the user interface 218 for activating the rack system 80. The activation input is communicated to the controller 210, which activates the motors 82 and consequently adjusts the telescoping actuators 36 from the retracted position 38 to the extended position 40 in response to the input. As the telescoping actuators 36 are moving, the rack 26 is simultaneously adjusted from the stowed position 28 to the deployed position 30.

Once the rack 26 is in the deployed position 30, the rack 26 extends at least partially out of the cooking cavity 14. The user may then place the food item 170 on the rack 26, remove the food item 170 from the rack 26, or otherwise interact with the food item 170. When the user is done adding or removing the food item 170, the user may input a subsequent control command in the user interface 218 for activating the rack system 80. Upon the second input, the motors 82 are activated and telescoping actuators 36 are adjusted from the extended position 40 to the retracted position 38. As the telescoping actuators 36 are moving, the rack 26 is adjusted from the deployed position 30 to the stowed position 28, entirely within the cooking cavity 14. The user may then rotate the door 70 to the closed position 74.

In certain aspects, activation of the rack system 80 may be accomplished via a single touch event or push of a button on the user interface 218. The single triggering event may be advantageous for when the user is holding the food item 170 in both hands. The rack system 80 may increase convenience of the user in using the cooking appliance 10.

Use of the present device may provide for a variety of advantages. For example, the rack 26 may automatically be adjusted between the stowed position 28 and the deployed position 30 by the actuator assembly 32. Additionally, the automatic adjustment of the rack 26 may reduce or eliminate physical efforts of the user to place the food item 170 on or remove the food item 170 from the rack 26. The rack 26 may also be more accessible to the user when in the stowed position 28. Also, the user may not have to reach substantially into the cooking cavity 14 when the rack 26 is automatically adjusted to the deployed position 30. Without reaching substantially into the cooking cavity 14, burn hazards to the user may be reduced. Additionally, food spillage may be reduced as the user may not be shifting the food item 170 from the cooking cavity 14 proximate the rear wall 34, but from a closer location. Further, the automatic rack system 80 may increase the user experience and convenience in using the cooking appliance 10. Moreover, when the user is holding the food item 170 the rack system 80 may be conveniently activated through the user interface 218.

Additionally, the rack system 80 may be utilized with each cooking level 50 within the cooking cavity 14. Also, the various configurations of the connector 42 may be interchangeable depending on the cooking level 50 at which the rack 26 is positioned. The user may rotatably disengage the nut 160 from the threads 200 on a first connector 42 and then secure a second connector 42 to the telescoping actuator 36 with the nut 160. Further, the rack system 80 may be utilized with various configurations of the cooking cavity 14, including cooking cavities 14 having sidewalls 18, 20 that are embossed or flat. Additionally, the actuator assembly 32 may also control the movement of the rack 26. Additional benefits or advantages may be realized or achieved.

The device disclosed herein is further summarized in the following paragraphs and is further characterized by combinations of any and all of the various aspects described therein.

According to another aspect of the present disclosure, a cooking appliance includes a body that defines a cooking cavity. Guide members are coupled to a sidewall within the cooking cavity. The guide members define at least a first cooking level and a second cooking level. A rack is disposed within the cooking cavity. The rack is selectively positionable on the guide members. The rack is operable between a stowed position within the cooking cavity and a deployed position extending at least partially out of the cooking cavity. An actuator assembly is coupled to a rear wall that defines the cooking cavity. The actuator assembly includes a telescoping actuator operable between a retracted position and an extended position. At least one connector is coupled to the rack and a distal end of the telescoping actuator. The rack is adjusted from the stowed position to the deployed position as the telescoping actuator is adjusted from the retracted position to the extended position.

According to another aspect, a baffle is disposed adjacent to a rear wall, wherein a telescoping actuator extends through the baffle into a cooking cavity.

According to another aspect, a distal end of a telescoping actuator defines an aperture, and wherein an end of at least one connector extends through the aperture.

According to another aspect, an end of at least one connector includes threads that engage a nut, and wherein the nut is disposed on an opposing side of a telescoping actuator relative to a rack.

According to another aspect, a first cooking level and a second cooking level are disposed at different heights within a cooking cavity, wherein at least one connector is disposed in a first position when a rack is disposed at the first cooking level and a second position when the rack is positioned at the second cooking level.

According to another aspect, at least one connector includes a first connector having a first length and a second connector having a second length, wherein the first connector couples a rack with a telescoping actuator when the rack is at a first cooking level and the second connector couples the rack with the telescoping actuator when the rack is at a second cooking level.

According to another aspect, a cooking appliance includes a user interface, a motor coupled to a telescoping actuator, and a controller communicatively coupled to the user interface and the motor, wherein the controller activates the motor to adjust a position of a telescoping actuator in response to an input from the user interface.

According to another aspect, a rack system for a cooking appliance includes a rack configured to be positioned at multiple cooking levels within a cooking cavity. The rack includes an inner edge. An actuator assembly is coupled to the rack and configured to adjust the rack from a stowed position to a deployed position. The actuator assembly includes a telescoping actuator adjustable between a retracted position and an extended position. At least one connector has a first end selectively coupled to a distal end of the telescoping actuator and a second end selectively coupled to the inner edge of the rack. A motor is operably coupled to the telescoping actuator. A controller is operably coupled to the actuator assembly. The controller is configured to activate the motor.

According to another aspect, a user interface is configured to receive an input, wherein a controller activates a motor in response to the input.

According to another aspect, multiple cooking levels include a first cooking level above a telescoping actuator and a second cooking level below the telescoping actuator, wherein at least one connector is disposed in a first position when a rack is at the first cooking level and a second position when the rack is at the second cooking level.

According to another aspect, multiple cooking levels include a first cooking level at a first distance from a telescoping actuator and a second cooking level at a second distance from the telescoping actuator, wherein at least one connector includes a first connector coupled to a rack when the rack is positioned at the first cooking level and a second connector coupled to the rack when the rack is positioned at the second cooking level.

According to another aspect, multiple cooking levels include a third cooking level at a third distance from a telescoping actuator, and wherein the at least one connector includes a third connector coupled to the rack when the rack is positioned at the third cooking level.

According to another aspect, each of a first connector, a second connector, and a third connector are different lengths and configured to be coupled to a telescoping actuator in a first position and a second position.

According to another aspect, a first end of at least one connector includes a snap feature for engaging a rack.

According to yet another aspect, a rack assembly for a cooking appliance includes a rack operable between a stowed position and a deployed position. At least one telescoping actuator is operable between a retracted position and an extended position. At least one connector has a first end coupled to a distal end of the telescoping actuator and a second end coupled to the rack. The rack is adjusted from the stowed position to the deployed position as the telescoping actuator adjusts from the retracted position to the extended position.

According to another aspect, at least one connector includes multiple connectors of differing lengths, wherein the connectors are interchangeable based on a cooking level of a rack relative to at least one telescoping actuator.

According to another aspect, at least one connector includes a coupling feature for selectively engaging a rack.

According to another aspect, a motor is coupled to a proximal end of at least one telescoping actuator and a controller is communicatively coupled to the motor, wherein the controller is configured to activate the motor to adjust at least one telescoping actuator between the retracted position and the extended position.

According to another aspect, at least one telescoping actuator includes a first side actuator configured to couple to a first lateral side of a rack and a second side actuator configured to couple to a second lateral side of the rack.

According to another aspect, at least one connector is configured to be positioned at a first position extending in a first direction from at least one telescoping actuator and a second position extending in a second opposing direction from the at least one telescoping actuator.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A cooking appliance, comprising:
    a body defining a cooking cavity;
    guide members coupled to a sidewall within the cooking cavity, wherein the guide members define at least a first cooking level and a second cooking level;
    a rack disposed within the cooking cavity, wherein the rack is selectively positionable on the guide members, and wherein the rack is operable between a stowed position within the cooking cavity and a deployed position extending at least partially out of the cooking cavity;
    an actuator assembly coupled to a rear wall that defines the cooking cavity, wherein the actuator assembly includes:
        a telescoping actuator operable between a retracted position and an extended position; and
        at least one connector coupled to the rack and a distal end of the telescoping actuator, wherein the rack is adjusted from the stowed position to the deployed position as the telescoping actuator is adjusted from the retracted position to the extended position; and
    a baffle disposed adjacent to the rear wall, wherein the telescoping actuator extends through the baffle into the cooking cavity.

2. The cooking appliance of claim 1, wherein the distal end of the telescoping actuator defines an aperture, and wherein an end of the at least one connector extends through the aperture.

3. The cooking appliance of claim 2, wherein the end of the at least one connector includes threads that engage a nut, and wherein the nut is disposed on an opposing side of the telescoping actuator relative to the rack.

4. The cooking appliance of claim 1, wherein the first cooking level and the second cooking level are disposed at different heights within the cooking cavity, and wherein the at least one connector is disposed in a first position when the rack is disposed at the first cooking level and a second position when the rack is positioned at the second cooking level.

5. The cooking appliance of claim 1, wherein the at least one connector includes a first connector having a first length and a second connector having a second length, wherein the first connector couples the rack with the telescoping actuator when the rack is at the first cooking level and the second connector couples the rack with the telescoping actuator when the rack is at the second cooking level.

6. The cooking appliance of claim 1, further comprising:
    a user interface;
    a motor coupled to the telescoping actuator; and
    a controller communicatively coupled to the user interface and the motor, wherein the controller activates the motor to adjust a position of the telescoping actuator in response to an input from the user interface.

7. A rack system for a cooking appliance, comprising:
    a body defining a cooking cavity;
    guide members coupled to a sidewall within the cooking cavity, wherein the guide members define multiple cooking levels within the cooking cavity;
    a rack configured to be selectively positioned on the guide members at the multiple cooking levels within the cooking cavity, wherein the rack includes an inner edge;

an actuator assembly coupled to the rack and configured to adjust the rack from a stowed position within the cooking cavity to a deployed position extending at least partially out of the cooking cavity, wherein the actuator assembly includes:
  a telescoping actuator adjustable between a retracted position and an extended position;
  at least one connector having a first end selectively coupled to a distal end of the telescoping actuator and a second end selectively coupled to the inner edge of the rack, wherein the multiple cooking levels include a first cooking level above the telescoping actuator and a second cooking level below the telescoping actuator, and wherein the at least one connector is disposed in a first position when the rack is at the first cooking level and a second position when the rack is at the second cooking level; and
  a motor operably coupled to the telescoping actuator; and
a controller operably coupled to the actuator assembly, wherein the controller is configured to activate the motor.

8. The rack system of claim 7, further comprising:
  a user interface configured to receive an input, wherein the controller activates the motor in response to the input.

9. The rack system of claim 7, wherein the multiple cooking levels include the first cooking level at a first distance from the telescoping actuator and the second cooking level at a second distance from the telescoping actuator, and wherein the at least one connector includes a first connector coupled to the rack when the rack is positioned at the first cooking level and a second connector coupled to the rack when the rack is positioned at the second cooking level.

10. The rack system of claim 9, wherein the multiple cooking levels include a third cooking level at a third distance from the telescoping actuator, and wherein the at least one connector includes a third connector coupled to the rack when the rack is positioned at the third cooking level.

11. The rack system of claim 10, wherein each of the first connector, the second connector, and the third connector are different lengths and configured to be coupled to the telescoping actuator in the first position and the second position.

12. The rack system of claim 7, wherein the first end of the at least one connector includes a snap feature for engaging the rack.

13. A rack assembly for a cooking appliance, comprising:
  a body defining a cooking cavity, wherein the body includes guide members coupled to sidewalls within the cooking cavity;
  a rack configured to be positioned on the guide members, wherein the rack is operable between a stowed position within the cooking cavity and a deployed position extending at least partially out of the cooking cavity;
  at least one telescoping actuator operable between a retracted position and an extended position; and
  at least one connector having a first end coupled to a distal end of the telescoping actuator and a second end coupled to the rack, wherein the at least one connector is configured to be positioned at a first position extending in a first direction from the at least one telescoping actuator and a second position extending in a second opposing direction from the at least one telescoping actuator, and wherein the rack is adjusted from the stowed position to the deployed position as the telescoping actuator adjusts from the retracted position to the extended position.

14. The rack assembly of claim 13, wherein the at least one connector includes multiple connectors of differing lengths, wherein the connectors are interchangeable based on a cooking level of the rack relative to the at least one telescoping actuator.

15. The rack assembly of claim 13, wherein the at least one connector includes a coupling feature for selectively engaging the rack.

16. The rack assembly of claim 15, further comprising:
  a motor coupled to a proximal end of the at least one telescoping actuator; and
  a controller communicatively coupled to the motor, wherein the controller is configured to activate the motor to adjust the at least one telescoping actuator between the retracted position and the extended position.

17. The rack assembly of claim 13, wherein the at least one telescoping actuator includes a first side actuator configured to couple to a first lateral side of the rack and a second side actuator configured to couple to a second lateral side of the rack.

* * * * *